United States Patent
Cheng et al.

(10) Patent No.: US 10,325,474 B2
(45) Date of Patent: Jun. 18, 2019

(54) METHOD, DEVICE, AND SYSTEM FOR FAULT UNIT INDICATION

(71) Applicant: EMC IP Holding Company LLC, Hopkinton, MA (US)

(72) Inventors: Jesse Cheng, Shanghai (CN); Haifang Zhai, Shanghai (CN); Wei Shu, Shanghai (CN); Sean Xu, Shanghai (CN); Sandburg Hu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/712,262

(22) Filed: Sep. 22, 2017

(65) Prior Publication Data
US 2018/0089982 A1 Mar. 29, 2018

(30) Foreign Application Priority Data

Sep. 23, 2016 (CN) .......................... 2016 1 0847723

(51) Int. Cl.
*G06F 11/00* (2006.01)
*G08B 21/18* (2006.01)
*G08B 5/36* (2006.01)

(52) U.S. Cl.
CPC .............. *G08B 21/18* (2013.01); *G06F 11/00* (2013.01); *G08B 5/36* (2013.01)

(58) Field of Classification Search
None
See application file for complete search history.

(56) References Cited

U.S. PATENT DOCUMENTS

| 4,868,832 | A | * | 9/1989 | Marrington | G06F 11/2015 365/229 |
| 5,018,143 | A | * | 5/1991 | Platteter | G03G 15/55 714/48 |
| 5,519,832 | A | * | 5/1996 | Warchol | G06F 11/22 714/46 |
| 5,673,028 | A | * | 9/1997 | Levy | G01D 7/005 116/209 |
| 5,880,955 | A | * | 3/1999 | Matoba | G06F 13/409 700/17 |
| 6,356,057 | B1 | * | 3/2002 | Shilo | G01R 31/40 320/127 |
| 6,556,438 | B1 | * | 4/2003 | Bolognia | G06F 1/20 361/679.48 |
| 6,862,695 | B2 | * | 3/2005 | Lin | G06F 11/326 714/36 |

(Continued)

*Primary Examiner* — Steven Lim
*Assistant Examiner* — Muhammad Adnan
(74) *Attorney, Agent, or Firm* — Brian J. Colandreo; Heath M. Sargeant; Holland & Knight LLP

(57) ABSTRACT

Embodiments of the present disclosure relate to a solution for fault unit indication. In some embodiments, there is provided a method for positioning a fault unit. The method comprises supplying power to a controller and a light emitting diode (LED) circuit by a battery module, wherein the LED circuit includes a plurality of LEDs associated with a plurality of units. The method further comprises transmitting a trigger signal to the controller by the battery module in response to receiving a control signal for triggering positioning, such that an LED of the plurality of LEDs associated with a fault unit is turned on.

17 Claims, 3 Drawing Sheets

(56) References Cited

U.S. PATENT DOCUMENTS

| | | | | |
|---|---|---|---|---|
| 6,867,704 B2* | 3/2005 | Pellegrino | G06F 11/324 | 340/815.45 |
| 6,919,816 B2* | 7/2005 | Dearborn | G06F 11/326 | 312/223.5 |
| 7,002,459 B1* | 2/2006 | Escandon | B60Q 1/444 | 340/425.5 |
| 7,259,665 B2* | 8/2007 | Jones | G06F 1/30 | 340/506 |
| 7,437,621 B2* | 10/2008 | Kawase | G06F 11/328 | 714/47.1 |
| 7,805,618 B2* | 9/2010 | Covi | G06F 1/263 | 709/224 |
| 8,223,015 B2* | 7/2012 | Yuuki | G06F 11/326 | 340/286.02 |
| 8,427,301 B2* | 4/2013 | Siegman | H05K 7/1498 | 340/538 |
| 9,035,609 B1* | 5/2015 | Kim | H02J 1/10 | 320/107 |
| 9,116,530 B2* | 8/2015 | Fragnito | G08B 29/181 | |
| 9,116,619 B2* | 8/2015 | Thiesfeld | G11B 33/10 | |
| 9,592,738 B1* | 3/2017 | Paryani | G06F 11/07 | |
| 9,940,235 B2* | 4/2018 | Bucaro | G06F 12/0684 | |
| 2002/0095487 A1* | 7/2002 | Day | H04L 29/06 | 709/223 |
| 2003/0087677 A1* | 5/2003 | Miller | H04B 1/04 | 455/572 |
| 2004/0100933 A1* | 5/2004 | Iwabuchi | H04L 12/2809 | 370/338 |
| 2004/0177143 A1* | 9/2004 | Maciel | H04L 41/22 | 709/224 |
| 2005/0240832 A1* | 10/2005 | Owhadi | G06F 11/0748 | 714/46 |
| 2005/0256942 A1* | 11/2005 | McCardle | G06F 11/3495 | 709/220 |
| 2006/0190768 A1* | 8/2006 | Kawase | G06F 11/328 | 714/31 |
| 2006/0283944 A1* | 12/2006 | Holley | A01N 1/02 | 235/385 |
| 2007/0010912 A1* | 1/2007 | Feingold | G01N 35/0092 | 700/245 |
| 2007/0220324 A1* | 9/2007 | Covi | G06F 1/263 | 714/14 |
| 2007/0222597 A1* | 9/2007 | Tourrilhes | G06Q 10/06 | 340/572.1 |
| 2008/0214140 A1* | 9/2008 | Caveney | H04L 12/66 | 455/402 |
| 2009/0138110 A1* | 5/2009 | Kohyama | H04R 29/007 | 700/94 |
| 2009/0234512 A1* | 9/2009 | Ewing | H04L 12/10 | 700/295 |
| 2009/0309570 A1* | 12/2009 | Lehmann | G06F 1/26 | 323/318 |
| 2010/0142544 A1* | 6/2010 | Chapel | H01R 25/006 | 370/401 |
| 2014/0088780 A1* | 3/2014 | Chen | G05F 1/66 | 700/295 |
| 2016/0098311 A1* | 4/2016 | Boecker | G06F 11/0772 | 714/37 |
| 2016/0123600 A1* | 5/2016 | Phillips | H04B 10/116 | 99/337 |
| 2016/0203040 A1* | 7/2016 | Calhoun | G06F 11/327 | 714/57 |
| 2016/0311328 A1* | 10/2016 | Kim | B60L 11/18 | |
| 2016/0377083 A1* | 12/2016 | Shabbir | F04D 27/004 | 700/282 |
| 2017/0085413 A1* | 3/2017 | Cencini | H05K 7/1497 | |
| 2017/0126032 A1* | 5/2017 | Beaston | H02J 7/0022 | |

* cited by examiner

US 10,325,474 B2

METHOD, DEVICE, AND SYSTEM FOR FAULT UNIT INDICATION

RELATED APPLICATIONS

This application claim priority from Chinese Patent Application Number CN201610847723.4, filed on Sep. 23, 2016 at the State Intellectual Property Office, China, titled "METHOD, DEVICE, AND SYSTEM OF FAULT UNIT INDICATION" the contents of which is herein incorporated by reference in its entirety.

FIELD

Embodiments of the present disclosure generally relate to the field of servers, and more specifically, to fault unit indication.

BACKGROUND

In many computer platforms, there is a plurality of units, such as field replaceable unit (FRU). When a unit is encountered with a fault, it is required to determine the unit in fault. Therefore, there is a need for a solution for fault unit indication to facilitate positioning of the fault unit.

SUMMARY

Embodiments of the present disclosure provide a solution for fault unit indication.

According to a first aspect of the present disclosure, there is provided a method for positioning a fault unit. The method comprises supplying power to a controller and a light emitting diode (LED) circuit by a battery module, wherein the LED circuit includes a plurality of LEDs associated with a plurality of units. The method further comprises in response to receiving a control signal for triggering positioning, transmitting a trigger signal to the controller by the battery module such that an LED of the plurality of LEDs associated with the fault unit is turned on.

According to a second aspect of the present disclosure, there is provided a battery module coupled to a controller and a switch and including a control module, which is configured to cause the battery module to supplying power to the controller and a light emitting diode (LED) circuit, the LED circuit having a plurality of LEDs associated with a plurality of units; and in response to receiving a control signal from the switch for triggering positioning, transmit a trigger signal to the controller such that an LED of the plurality of LEDs associated with a fault unit is turned on.

According to a third aspect of the present disclosure, there is provided a system for positioning a fault unit. The system comprises a light emitting diode (LED) circuit including a plurality of LEDs associated with a plurality of units, a controller coupled to the LED circuit, a switch, and a battery module coupled to the controller and the switch, the battery module being configured to supply power to the controller and an LED circuit in response to receiving a control signal from the switch for triggering positioning; and transmit a trigger signal to a controller; wherein the controller is configured to transmit a driving signal that indicates a fault unit of the plurality of units to the LED circuit in response to receiving a trigger signal, such that an LED associated with the fault unit is turned on.

The Summary is to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of the present disclosure will become more apparent. The same reference sign usually refers to the same component in the example embodiments of the present disclosure.

DETAILED DESCRIPTION OF EMBODIMENTS

Preferred embodiments of the present disclosure will now be described in details with reference to the drawings. Although the drawings only show the preferred embodiments of the present disclosure, it should be appreciated that the present disclosure can be implemented by various manners and should not be limited to the embodiments illustrated herein. Instead, these embodiments are provided for a more thorough and complete version of the present disclosure, so as to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The terms "another embodiment" is to be read as "at least one further embodiment." The terms "first" and "second" can represent different or same objects. The following text may also include other explicit or implicit definitions.

Figure 1:
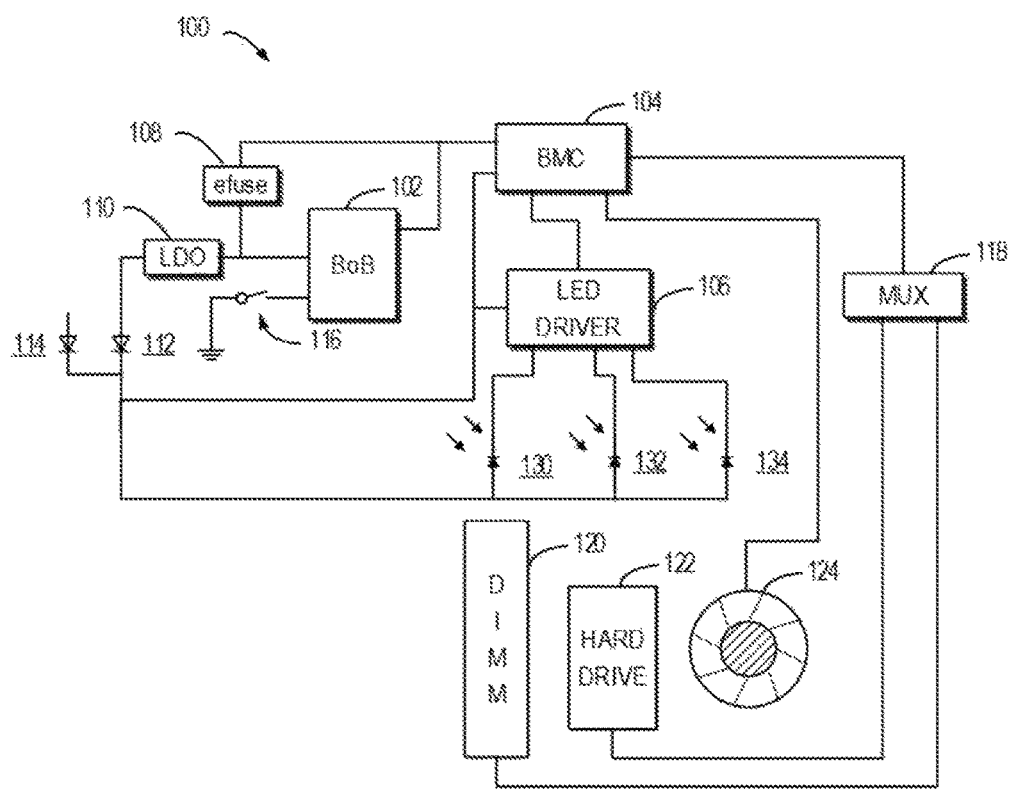
FIG. 1 is a schematic diagram of an fault indication environment according to embodiments of the present disclosure.

FIG. 1 is a schematic diagram of fault indication environment 100 according to embodiments of the present disclosure. It should be understood that the fault indication environment 100 shown in FIG. 1 is only exemplary and only shows components related to the embodiments of the present disclosure in the computer platform, rather than all components in the current computer platform. In some embodiments, the environment 100 shown in FIG. 1 can be implemented in the same mainboard. For example, the environment 100 can be implemented as a cassette server unit in a blade server.

As shown in FIG. 1, the environment 100 can comprise a battery on bus (BoB) or known as battery module or auxiliary power supply 102, a baseboard management controller (BMC) 104 and a LED circuit including a LED driver 106 and a plurality of LEDs 130-134. BoB 102 can power devices or modules such as a central processing unit (CPU) on a mainboard. For example, when the main power supply (e.g., PSU) on the mainboard is powered down, BoB 102 can enter a discharging state to power the CPU and the like in replace of the main power supply.

The BMC is a dedicated microcontroller usually embedded in the mainboard of the server. The BMC manages the interface between the environment management software and the platform hardware. The various sensors embedded in the computer environment reports various parameters such as temperature, fan speed to the BMC. The BMC monitors the sensors and, if a unit malfunctions (e.g., a parameter of the unit exceeds a predetermined range), the BMC sends a warning to the environment administrator via the network. Then the administrator can notify the engineer to the site for maintenance. It should be understood that although D1 illustrates BMC 104, those skilled in the art can also use any other controller currently known or to be developed in the future to implement BMC 104.

FIG. 1 shows a plurality of units, including a dual in-line memory module (DIMM) 120, a hard drive 122, and a fan 124. The DIMM 120 can also be any other types of storage modules and the hard drive 122 can be implemented by a storage device with an interface such as M.2 and mSATA, for example, solid state disk. Additionally, the number and types of units shown in FIG. 1 are only exemplary and those skilled in the art will understand that more and less number and/or types of units can be implemented. In some embodiments, the units are field replaceable units, and the engineer can replace them on the site after a fault is detected.

The DIMM 120 and the hard drive 112 are connected to the BMC 104 via a multiplexer (also known as an expander or switch) 118. For example, the BMC 104 can use the I2C protocol to communicate with the units and monitors their states. The BMC 104 can detect the speed of the fan 124 based on a TACH signal and control the fan 124 by a PWM control signal. For example, if the BMC 104 determines that the speed of certain fan deviates from the PWM control signal (or the deviation exceeds the predetermined threshold), the BMC determines that there is a fault in the fan.

In the operating mode of the system, the BMC 104 can perform a real-time monitor or a timed detection (e.g., a periodic detection) on the operation state of each unit. If the operation of a certain unit is detected to be abnormal, the signal indicating the abnormality is sent to the BoB 102 and stored in a memory of the BoB 102. The memory of the BoB 102 can be a flash memory, for example. Alternatively, the BMC 104 can also store the indication signal in other memory on the mainboard, for example, a flash memory. Upon detecting a fault, the BMC 104 can also issue a hard warning to the administrator via the network.

In some embodiments, the indication signal can specify the name and number of the unit. For example, DIMM02 can represent that the second DIMM is faulty and FAN01 can represent the first fan is faulty and so on.

After receiving the warning, the field engineer can come to the field to determine the source of the fault. If a field replaceable unit (FRU) is faulty, the engineer can replace the fault FRU. This is usually called a service mode of the system. Then, the field engineer can pull the mainboard out of the rack. The main power supply, such as PDU etc., cannot continue to power the mainboard and each unit thereon. Furthermore, as shown in FIG. 1, the power supply at the diode 114 is also indicated to be off and will not receive any inputs, for example, a voltage of 3.3V. Then, the BoB 102 can provide a main power supply output of 12V to the CPU on the mainboard via the main power supply switch to avoid data loss. In FIG. 1, the main power supply switch is shown to be an efuse 102, but it should be understood that any suitable controllable switch can act as a main power supply switch, such as a transistor.

In addition, the BoB 102 can also supply power to the LED driver 106, the LEDs 130-134 and the BMC 104 via a low dropout regulator (LDO) 110 and a diode 112. The LDO 110 can convert the 12V output voltage of the BoB 102 to a voltage of 3.3V, so as to supply power to the LED driver 106, the LEDs 130-134 and the BMC 104.

Although FIG. 1 illustrates a low dropout regulator, it should be appreciated that any other suitable voltage converters can also be used. Additionally, the voltages of 12V and 3.3V are provided only for exemplary purpose without limiting the scope of the present disclosure.

The power of the BoB 102 usually is not sufficient to provide the main power supply output of 12V for a long time. In this case, the field engineer can turn off the switch 116 after pulling out the mainboard to generate a control signal for triggering positioning. The switch 116 can be implemented by a button, for example. The control signal is transmitted to the BoB 102, which sends a trigger signal to the BMC 104 after receiving the control signal. In some embodiments, the trigger signal can include an indication signal indicating a fault unit. The BMC 104 can also break the efuse 108 by transmitting a main power supply off signal to the efuse 108 so as to stop providing the main power supply output of 12V, thereby saving the power of the BoB 102.

In some embodiments, after receiving the trigger signal from the BoB 102, the BMC 104 can generate a driving signal for controlling the LED driver 106 according to the indication signal included in the trigger signal. In an embodiment in which the trigger signal does not include the indication signal, the BMC 104 can obtain an indication signal from other memory on the mainboard to generate the driving signal. Then, the BMC 104 transmits the driving signal to the LED driver 106 to turn on the LED associated with the fault unit. In some embodiments, each unit is arranged adjacent to its associated LED to facilitate fault indication. For example, as shown in FIG. 1, the LED 130 is disposed adjacent to the DIMM 120, the LED 132 is disposed adjacent to the hard drive 122, and the LED 134 is disposed adjacent to the fan 124.

When the LED is turned on, the engineer can determine the corresponding unit. For example, if the LED 130 is turned on, the engineer can determine that the DIMM 120 is faulty. The engineer can replace the fault unit if it is a field replaceable unit. However, the engineer can turn off the switch 116 and put the mainboard back to allow it to operate normally.

Figure 2:
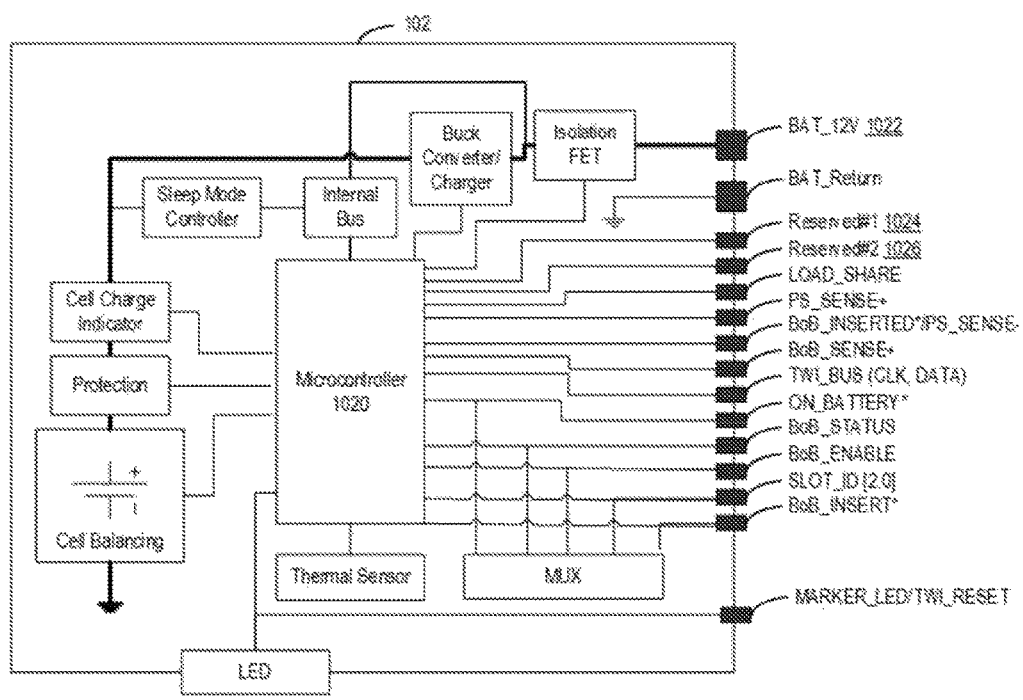
FIG. 2 is a structural block diagram of a battery module according to embodiments of the present disclosure.

In order to implement the environment 100 shown in FIG. 1, embodiments of the present disclosure can provide a new battery module. FIG. 2 illustrates a structural diagram of BoB 102 in a fault indication environment 100 according to embodiments of the present disclosure.

As shown in FIG. 2, the BoB 102 can be connected to the efuse 108 via a pin BAT_12V 1022. Additionally, the BoB 102 can also include a microcontroller 1020 as a control module configured for battery management and communication and step-down control. The microcontroller 1020 (and thus BoB 102) can have a plurality of input and output pins, where pins 1024 and 1026 are reserved pins. It should be understood that BoB 102 can also include any other suitable types of control modules. Other input and output pins will not be further detailed here, but those skilled in the art should know these pins can implement any suitable function currently known or to be developed in the future.

As described above, the microcontroller 1020 can cause the BoB 102 to power the controller (e.g., BMC 104 as shown in FIG. 1) and the LED circuit. Additionally, the microcontroller 1020 can also transmit a trigger signal to the controller (e.g., the BMC 104 shown in FIG. 1) in response to receiving a control signal from the switch (e.g., the switch 116) for triggering positioning, such that the LED associated with the fault unit is turned on. In some embodiments, the LED is arranged adjacent to its associated unit.

In some embodiments, the trigger signal comprises an indication signal indicating a fault unit. In this case, the microcontroller 1020 can also receive an indication signal from the fault unit via the controller and store the indication signal in the BoB 102, e.g., the memory of the BoB 102.

In some embodiments, the microcontroller 1020 can also transmit a main power supply off signal to the controller in response to receiving the control signal, such that the main power supply output of the BoB 102 is turned off. In some embodiments, the units are field replaceable units, which can be replaced by the engineer.

In some embodiments, the pin 1024 can be coupled to the switch 116 and the pin 1026 can be coupled to BMC 104 for transmitting a control signal to the BMC 104. Additionally, the use of two reserved pins of the BoB 102 minimizes the impact on the original design and improves the backward compatibility.

Figure 3:
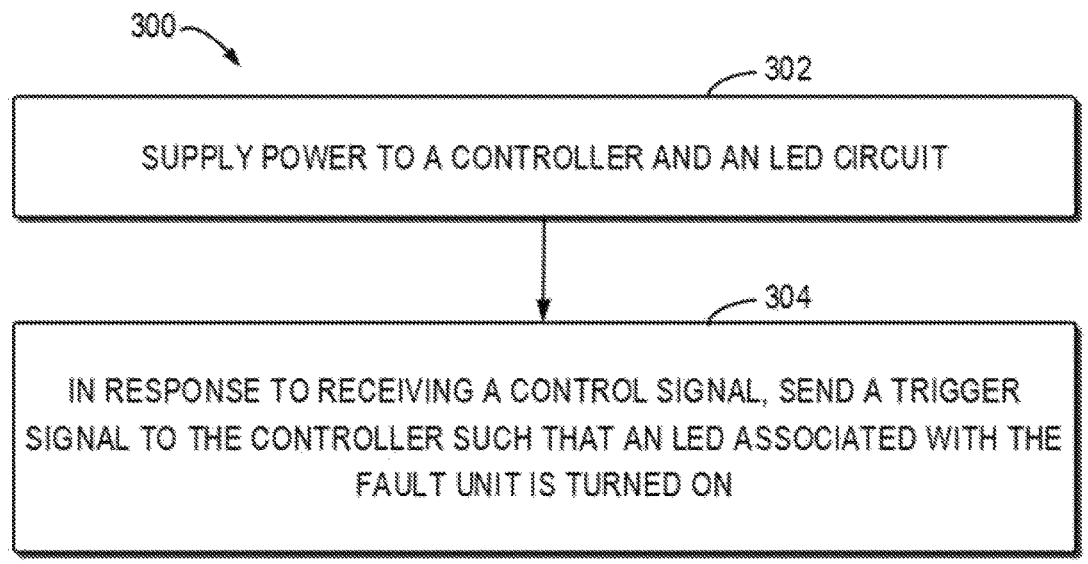
FIG. 3 is a flow chart of a fault indication method according to embodiments of the present disclosure.

FIG. 3 is a flow chart of a method 300 for a fault indication system according to embodiments of the present disclosure. The method 300 will now be described with reference to FIGS. 1 and 2. In some embodiments, the method 300 can be implemented by the BoB 102 shown in FIGS. 1 and 2. For example, the method 300 can be implemented by firmware in a microcontroller 1020 on the BoB 102. It should be understood that the method 300 can also comprise additional steps (not shown) and/or omit the steps as shown. The scope of the subject matter described herein is not limited in this regard.

At 302, the battery module supplies power to the controller and the light emitting diode (LED) circuit, which includes a plurality of LEDs associated with a plurality of units. The controller can be implemented by the BMC 104 shown in FIG. 1. In some embodiments, the BoB 102 can supply power to the controller and the LED circuit through the voltage regulator by the pin 1022.

In some embodiments, the plurality of units are field replaceable units, which are easy to replace. In some embodiments, an LED of the plurality of LEDs is arranged adjacent to the associated units of the plurality of units, so as to facilitate fault unit indication.

At 304, the battery module transmits a trigger signal to the controller in response to receiving a control signal for triggering positioning, such that the LED of the plurality of LEDs associated with the fault unit is turned on. For example, the BoB 105 can transmit a trigger signal to the controller via the pin 1024. After receiving the trigger signal, the controller can transmit a control signal to the LED driver to drive a respective LED, such that the engineer can easily replace the fault unit especially when the fault is a field replaceable unit.

In some embodiments, the trigger signal comprises an indication signal indicating a fault unit. In this case, the method 300 can also comprise receiving an indication signal by the battery module from the fault unit through the controller and storing the indication signal in the battery module, such as the memory of the battery module.

In some embodiments, the method 300 can also comprise transmitting a main power supply off signal to the controller in response to receiving a control signal, such that the main power supply output of the battery module is turned off. In this way, the power of the battery module may be saved, which facilitates the fault unit positioning function.

Each embodiment of the present disclosure has been disclosed above and the above explanations are exemplary and non-exhaustive, and not limited to the each embodiment disclosed. Without departing from the scope and principles of the described embodiments, many variations and modifications are obvious for those ordinary skilled in the art. The terms selected herein aim to explain the principle and practical application of each embodiment or improve the technology of the market in the best way, or to make other ordinary skilled in the art understand each embodiment disclosed herein.

We claim:

1. A method for positioning a fault unit, comprising:
   determining, by a controller, that a main power supply for a plurality of units is indicated to be off;
   providing, by a battery module, power to the controller and a light emitting diode (LED) circuit, the LED circuit including a plurality of LEDs associated with the plurality of units;
   in response to determining that the main power supply is indicated to be off, providing, by a main power supply output of the battery module, power to the plurality of units;
   in response to receiving a control signal for triggering positioning, transmitting, by the battery module, a trigger signal to the controller, such that an LED of the plurality of LEDs associated with the fault unit is turned on; and
   in response to receiving the control signal, transmitting, by the battery module, a main power supply off signal to the controller such that the main power supply output of the battery module is turned off, wherein the battery module continues to provide power to the controller and the LED circuit after the main power supply output of the battery module is turned off.

2. The method of claim 1, wherein the trigger signal comprises an indication signal indicating the fault unit.

3. The method of claim 2, further comprising:
   receiving, by the battery module, the indication signal from the fault unit via the controller; and
   storing the indication signal in the battery module.

4. The method of claim 1, wherein the plurality of units are field replaceable units.

5. The method of claim 1, wherein an LED of the plurality of LEDs is arranged adjacent to an associated unit of the plurality of units.

6. A battery module coupled to a controller and a switch, comprising:
   a control module configured to:
      cause the battery module to provide power to the controller and a light emitting diode (LED) circuit, the LED circuit having a plurality of LEDs associated with a plurality of units;
      in response to the controller determining that the main power supply is indicated to be off, cause the battery module to provide, by a main power supply output of the battery module, power to the plurality of units;
      in response to receiving a control signal from the switch for triggering positioning, transmit a trigger signal to the controller such that a LED of the plurality of LEDs associated with a fault unit is turned on, and
      in response to receiving the control signal, transmit, by the battery module, a main power supply off signal to the controller such that the main power supply output of the battery module is turned off, wherein the battery module continues to provide power to the controller and the LED circuit after the main power supply output of the battery module is turned off.

7. The battery module of claim 6, wherein the trigger signal comprises an indication signal indicating the fault unit.

8. The battery module of claim 7, wherein the control module is further configured to:
   receive the indication signal from the fault unit via the controller; and
   store the indication signal in the battery module.

9. The battery module of claim 6, wherein the plurality of units are field replaceable units.

10. The battery module of claim 6, wherein an LED of the plurality of LEDs is arranged adjacent to an associated unit of the plurality of units.

11. The battery module of claim 6, wherein the battery module is coupled to the switch via a first pin and to the controller via a second pin, and wherein the first and second pins are reserved pins of the battery module.

12. A system for positioning a fault unit, comprising:
   a light emitting diode (LED) circuit including a plurality of LEDs associated with a plurality of units;
   a controller coupled to the LED circuit;
   a switch;
   a main power supply switch; and
   a battery module coupled to the controller and the switch and configured to:
      in response to receiving a control signal from the switch for triggering positioning, provide power to the controller and the LED circuit,
      in response to receiving the control signal, transmit a main power supply off signal to the controller, wherein the battery module continues to provide power to the controller and the LED circuit after the main power supply output of the battery module is turned off;
      in response to receiving the control signal from the switch for triggering positioning, transmit a trigger signal to the controller,
   wherein the controller is configured to:
      determine that a main power supply is indicated to be off,
      in response to determining that the main power supply is indicated to be off, cause the battery module to provide, by a main power supply output of the battery module, power to the plurality of units,
      in response to receiving the main power supply off signal, turn off the main power supply switch, and
      in response to receiving the trigger signal, transmit to the LED circuit a driving signal that indicates a fault unit of the plurality of units, such that an LED associated with the fault unit is turned on.

13. The system of claim 12, wherein the LED circuit includes a LED driver configured to receive the driving signal and to drive the LED associated with the fault unit.

14. The system of claim 12, wherein the trigger signal comprises an indication signal indicating the fault unit.

15. The system of claim 14, wherein the controller is coupled to the plurality of units and configured to receive the indication signal from the fault unit and to transmit the indication signal to the battery module for storage in the battery module.

16. The system of claim 12, wherein the plurality of units are field replaceable units.

17. The system of claim 12, wherein an LED of the plurality of LEDs is arranged adjacent to an associated unit of the plurality of units.

* * * * *